United States Patent [19]

Duttarer et al.

[11] 4,339,154
[45] Jul. 13, 1982

[54] VEHICLE BRAKE SYSTEM

[75] Inventors: Ralph M. Duttarer; Michael H. Estkowski; Russell P. Smith, all of St. Joseph, Mich.

[73] Assignee: Clark Equipment Company, Buchanan, Mich.

[21] Appl. No.: 165,839

[22] Filed: Jul. 3, 1980

[51] Int. Cl.³ .................... B60T 13/22; B60T 13/74
[52] U.S. Cl. ........................ 303/3; 192/4 A; 303/15; 303/71
[58] Field of Search ............ 188/170, 156, 106; 303/71, 3, 2, 9, 13, 15, 63, 7, 10, 6 M, 50-56; 192/4 A, 4 R, 8 R, 12 R, 13 R, 13 A, 91 R

[56] References Cited

U.S. PATENT DOCUMENTS

| | | | |
|---|---|---|---|
| 3,516,525 | 6/1970 | Skaggs | 192/4 A |
| 3,759,357 | 9/1973 | Bianchetta | 188/170 X |
| 3,978,946 | 9/1976 | Ream | 192/4 A |
| 3,985,210 | 10/1976 | Hodge et al. | 188/170 |
| 4,181,368 | 1/1980 | Ström | 303/9 X |

*Primary Examiner*—Douglas C. Butler
*Attorney, Agent, or Firm*—Harry G. Thibault

[57] ABSTRACT

A vehicle brake system for operating a spring applied, fluid pressure released brake. In order to assure that the brake is fully released before the vehicle is operated, the system requires the operator to perform two operations. He must move a manually operated hydraulic valve to the brake release position and in addition must close a normally open, momentary contact switch which actuates a second solenoid operated valve in series with the first valve to the brake release position. When pressure has built up in the brake actuator sufficiently to assure that it is fully released, a pressure sensor causes a hold-in circuit for the solenoid operated valve to be energized whereupon the operator can then release the momentary contact switch.

10 Claims, 3 Drawing Figures

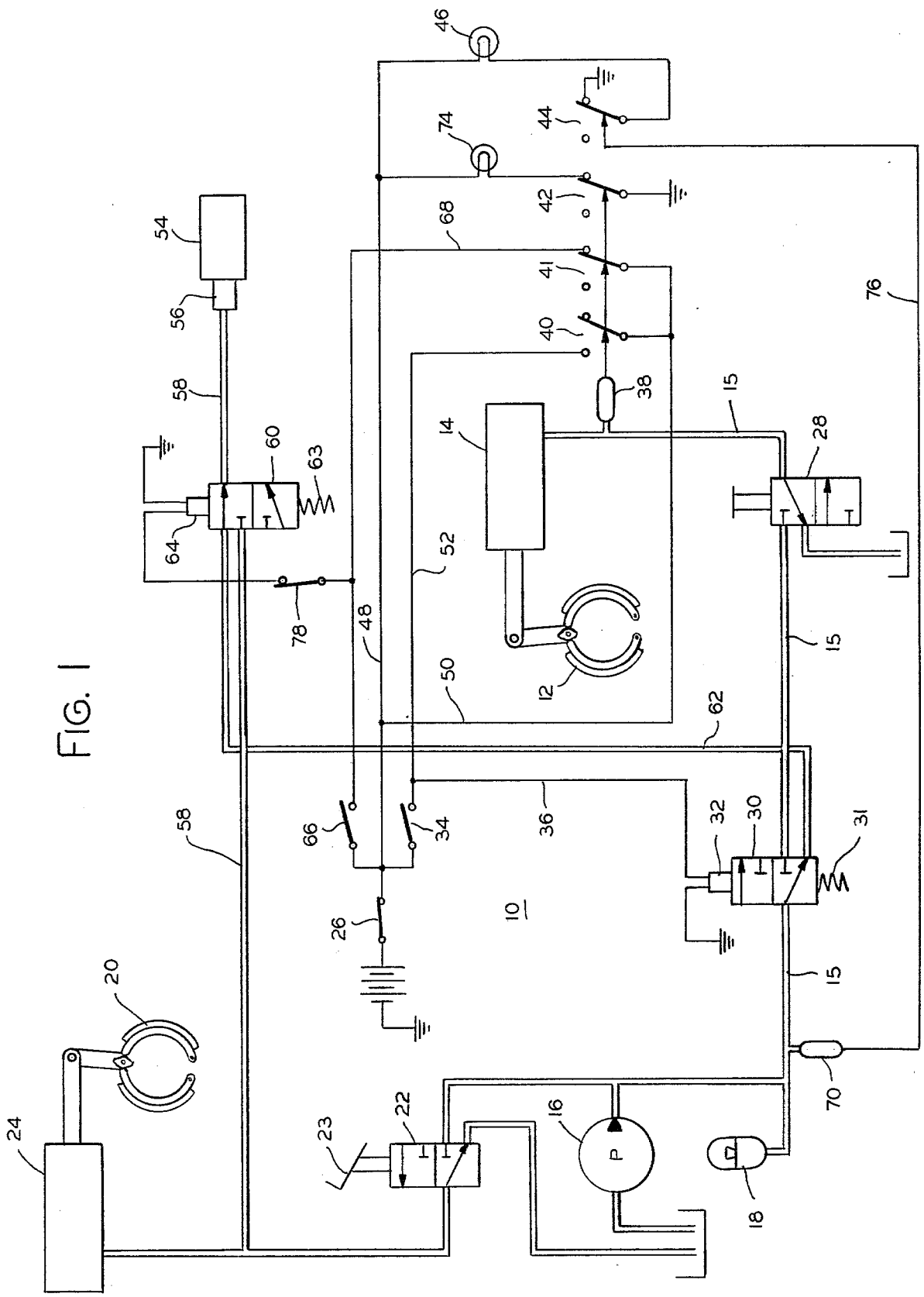

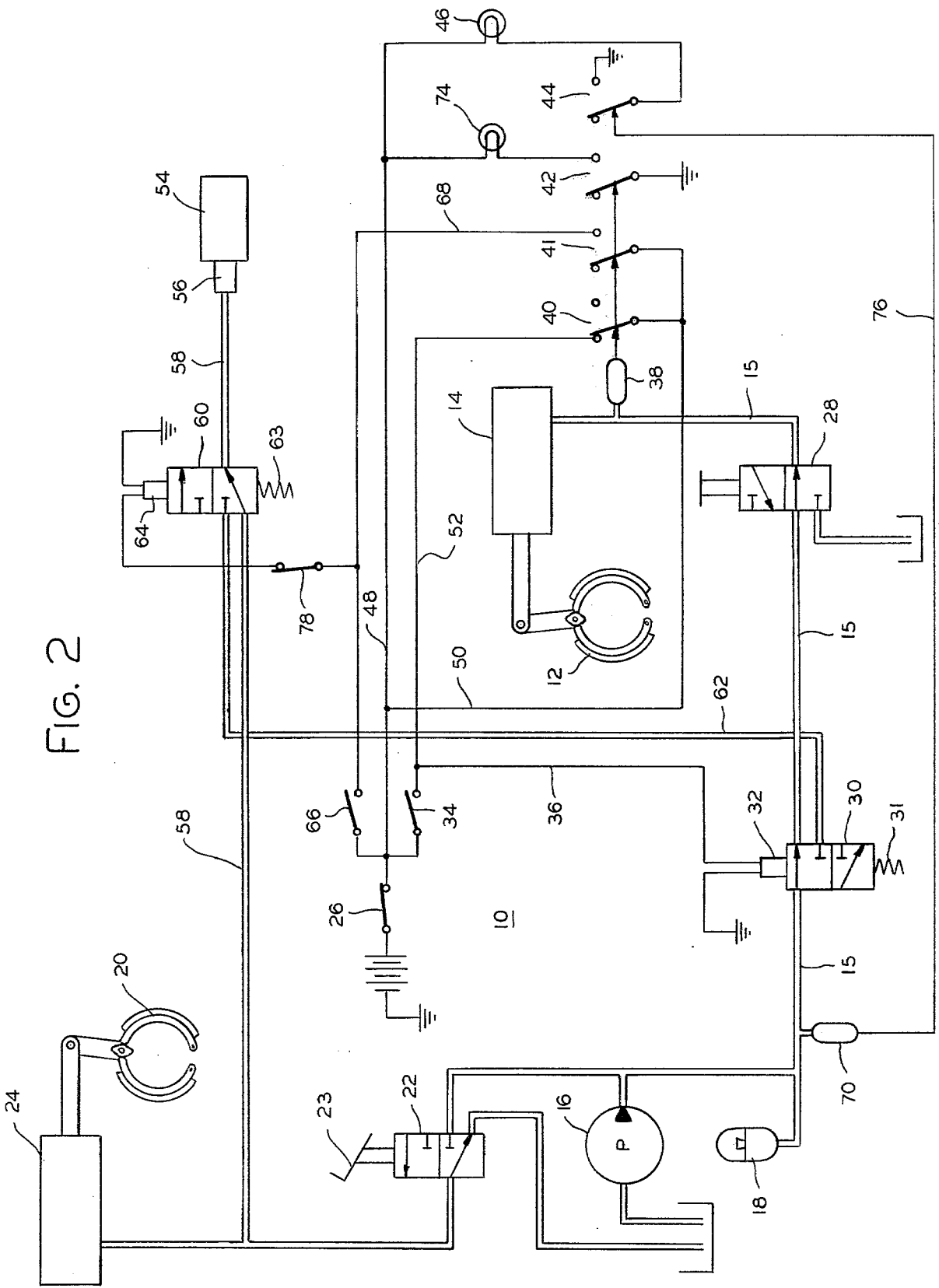

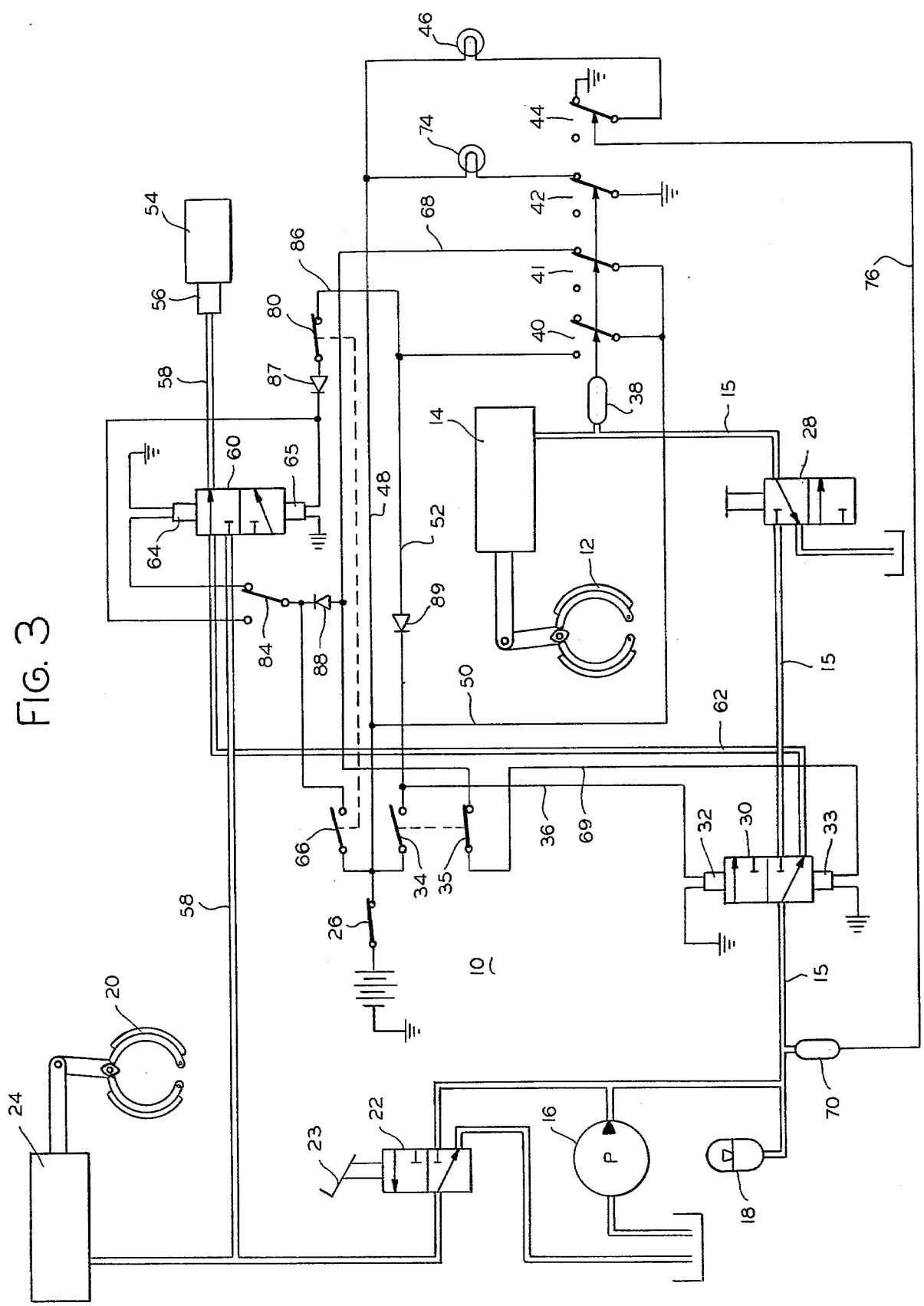

VEHICLE BRAKE SYSTEM

BACKGROUND OF THE INVENTION

1. Field of the Invention

This invention relates to a system for operating a spring applied, fluid pressure released brake mechanism for a vehicle.

2. Description of the Prior Art

It is known to use such a brake mechanism as the parking brake for a vehicle, particularly for off-the-road vehicles. However, difficulties have arisen with some vehicles employing spring applied fluid pressure released parking brakes because, even though the operator takes action to release the brake, it sometimes does not fully release. The result in such circumstances may be significant damage to the brake and perhaps other parts of the vehicle.

The concept is known of preventing the release of a spring applied, fluid pressure released brake unless a certain minimum release pressure is achieved. U.S. Pat. No. 3,759,357 employs such concept in the pilot control system for the dual drive motors of a hydrostatic drive vehicle, which motors are equipped with spring applied, fluid pressure released brakes.

It is known to interconnect the parking brake of a vehicle with the control for a power shift transmission automatically to deactivate the transmission when the parking brake is applied, and U.S. Pat. No. 3,978,946 shows such an arrangement.

It is known also to cause an automatic application of the parking brake of a vehicle if the vehicle engine is stopped or if there is a loss of oil pressure or electrical power, and such a system is disclosed in U.S. Pat. No. 3,985,210.

SUMMARY OF THE INVENTION

A vehicle brake system according to this invention includes a spring applied fluid pressure released brake actuator, with a manually operated two position valve in the fluid circuit between a pump supplying pressurized fluid and the actuator. A solenoid operated two position valve is also in such fluid circuit. A normally open momentary contact switch is arranged, when closed, to close an electrical circuit, for energizing the solenoid and moving the solenoid operated valve to pressurize the brake actuator when the other two position valve is in the brake release position. A pressure sensor responsive to the fluid pressure in the actuator closes a second electric switch when a predetermined pressure is reached in the sensor, and a connection from the second switch to the solenoid maintains the solenoid energized even though the momentary contact switch is opened.

BRIEF DESCRIPTION OF THE DRAWING

FIG. 1 of the drawing is a diagrammatic illustration of a vehicle brake system illustrating the best mode contemplated for the carrying out of this invention, FIG. 2 is the same as FIG. 1 except showing some elements of the system in a different condition, and FIG. 3 is a diagrammatic illustration of a second embodiment of the invention.

DESCRIPTION OF THE PREFERRED EMBODIMENT

A vehicle brake system according to this invention is indicated on the drawing by the numeral 10. The system includes a brake 12 which may be the parking brake of the vehicle and which is operated by means of a spring applied and fluid pressure released actuator 14. A pump 16 supplies pressurized fluid to actuator 14 through fluid conduit or circuit 15, and if hydraulic fluid is utilized an accumulator 18 may be connected in the hydraulic circuit to provide a stable hydraulic pressure. The pump and accumulator may also supply pressurized fluid to the service brakes 20 of the vehicle by means of a valve 22, operated by a foot pedal 23, which supplies pressure actuator 24.

To prepare the vehicle for operation the vehicle electrical system is energized by closing main switch 26 which energizes a conductor 48. A sensor 70 senses the pressure in the hydraulic circuit and when such pressure reaches a predetermined amount the sensor opens switch 44 which turns off a light or other indicator 46 which indicates to the operator that he may proceed with the operation of the vehicle, including releasing the parking brake.

In order to assure that brake 12 is completely released before the vehicle is operated this system provides two specific operations which the vehicle operator must carry out in order to release the brake, in addition to closing main switch 26 which energizes the electrical system for the vehicle. To release brake 12 the operator must operate two position valve 28 to move it from the brake of drain position illustrated in FIG. 1 of the drawing to the brake release or operating position of FIG. 2 whereby pressurized fluid can be admitted to brake actuator 14 providing solenoid operated valve 30 is also operated. Two position, three way valve 30 is operated between the brake on position of FIG. 1 and the brake released position of FIG. 2 by energizing solenoid 32 and this is accomplished by the operator closing the normally open momentary contact switch 34 which energizes the solenoid 32 through conductor 36.

When valves 28 and 30 have both been operated pressurized fluid is admitted to actuator 14 to release brake 12. The pressure in actuator 14 is sensed by sensor 38 which, when a predetermined pressure is reached, operates switches 40, 41 and 42. The opening of switch 42 turns off a light 74 or other indicator which comes on when main switch 26 is closed to indicate to the operator that the parking brake is applied. At the same time that switch 42 opens to turn off the indicator light, switch 40 closes and through conductors 50, 52 and 36 provides for maintaining solenoid 32 energized. When the operator sees the indicator light 74 go out he knows brake 12 is released and that he can release switch 34 and allow it to resume its normally open position.

Also shown diagrammatically on the drawing is a power shift transmission 54 for the vehicle which has associated with it a declutch or deactivating valve 56 which cuts off pressure to the transmission 54 when it is closed. As shown valve 56 may be operated to deactivate the transmission whenever service brake 20 is applied in normal operation of the vehicle. This occurs through hydraulic conduit 58 which connects valve 56 for operation by valve 22 simultaneously with brake actuator 24 providing a solenoid operated two position, three way valve 60 is in the vehicle operating or parking brake release position. Valve 60 is shown in FIG. 1 in the parking brake applied position; it is shown in FIG. 2 in the parking brake release position and its functions are further described hereafter.

It is desired when the parking brake 12 is applied that the transmission 54 be deactivated and that is the condition illustrated in FIG. 1 of the drawing. In such condition pressurized fluid is directed from the pump through valve 30 and hydraulic conduit 62 and through valve 60 to close declutch valve 56. When valve 30 is operated as a part of the operation previously described of releasing brake 12 conduit 62 is cut off from the pressure source 16, thereby depressurizing and opening declutch valve 56 and permitting the operation of transmission 54, all as illustrated in FIG. 2. However, when brake 12 is applied again, valve 30 then moves back to the position of FIG. 1, in the manner described in the following, and this closes valve 56 to deactivate transmission 54.

When the operator applies brake 12 by moving valve 28 to the brake applied position of FIG. 1, permitting a drop in fluid pressure in actuator 14, the pressure also decreases in sensor 38, and when a predetermined pressure is reached sensor 38 operates switches 40, 41 and 42 to the brake applied positions of FIG. 1. The opening of switch 40 deenergizes solenoid 32, and valve 30 which is biased by spring 31 returns to the position indicated in FIG. 1. When switch 41 closes it energizes solenoid 64 via conductor 68 and moves valve 60 to the position indicated in FIG. 1, against the action of biasing spring 63, and thus the declutch valve 56 is again closed. If there should be a failure in the hydraulic circuit 15 associated with actuator 14 the result would be the same as though the operator had manually moved valve 28, that is, with a sufficient reduction in hydraulic pressure, brake 12 would be applied and switches 40, 41 and 42 would be operated, the declutch valve would be closed, and the parking brake light would come on. Thus a fail safe arrangement is provided whereby the transmission is deactivated to prevent operation of the vehicle with the parking brake applied even though the brake application is caused by a failure in the hydraulic circuit. In this condition, the service brakes are still operable.

In an emergency situation it may be desired to be able to activate the transmission in order to move the vehicle even though the parking brake is applied as in FIG. 1. This is provided for by switch 78. Switch 78 is a normally closed switch which when it is opened deenergizes solenoid 64 and the bias of spring 63 then moves valve 60 from the declutch closed to the declutch open position, which opens declutch valve 56 even though brake 12 is applied.

Also, in the normal operation of the vehicle, which ordinarily occurs with the various elements of the hydraulic and electrical circuits in the condition indicated in FIG. 2, it may be desired to be able to apply service brakes 20 without deactivating transmission 54. This can be achieved by operating switch 66 which is normally open. When switch 66 is closed it energizes solenoid 64 and moves valve 60 to what would normally be the declutch closed position, but since conduit 62 is not pressurized in these circumstances, declutch valve 56 remains open.

It has been found in some circumstances, particularly when the hydraulic pressures involved are relatively high, that it may be preferable to employ valves which utilize solenoids in both directions instead of relying upon springs to move the valves in one direction and solenoids in the other. A second embodiment of the invention utilizing valves with return solenoids is illustrated in FIG. 3 of the drawing.

From the standpoint of the vehicle operator the embodiment of FIG. 3 operates the same as the first embodiment previously described. To release the parking brake the operator must operate both valve 28 and switch 34, and when he does the parking brake 12 is released. The parking brake is applied again in the same manner as the first embodiment by the operator returning valve 28 to the brake applied position. However, the system of FIG. 3 includes additional electrical devices and conductors to provide for the return of valves 30 and 60 electromagnetically.

FIG. 3 includes a normally closed switch 35 which is arranged for common operation with switch 34 so that when the latter is closed the former is opened. Switch 35 is connected to energize a return solenoid 33 to return valve 30 when it is energized; solenoid 33 replaces spring 31. When switch 41 is in its brake applied position solenoid 33 is energized via conductor 68, switch 35 and conductor 69. The switch 41 controls valve 60 so that it operates in the same manner in the system of FIG. 3 as in the previous embodiment. When switch 41 is in the brake applied position solenoid 64 is energized through conductor 68 and a switch 84 to maintain declutch valve 56 in the closed position. When switch 40 moves to the brake release position it energizes solenoid 65 through conductor 86 and a normally closed switch 80 to move valve 60 back to the operating or declutch valve open position; solenoid 65 replaces the spring 63 of the first embodiment.

Switch 84 in the system of FIG. 3 performs the same function as switch 78 in the previous embodiment. If, in an emergency situation, it is desired to activate the transmission in order to move the vehicle even though the parking brake is applied switch 84 is moved from the normal position shown in FIG. 3 to its other position which in addition to deactivating solenoid 64 activates solenoid 65 to move valve 60 to the declutch valve open position.

Switch 80 works with switch 66 in the FIG. 3 embodiment to make it possible to apply the service brakes 20 without closing declutch valve 56 to deactivate the transmission 54. Switch 80 has a common operator with switch 66 as indicated by the dashed line connecting them so that when switch 66 is closed switch 80 opens. Opening switch 80 deenergizes solenoid 65 while closing switch 66 energizes solenoid 64 and thus valve 60 moves to the position which opens declutch valve 56. Diodes 87, 88 and 89 have been added to the system of FIG. 3 to prevent undesired current flow.

While we have illustrated and described herein the best mode contemplated for carrying out our invention it will be appreciated that modifications may be made. Accordingly, it should be understood that we intend to cover by the appended claims all such modifications which fall within the true spirit and scope of our invention.

We claim:

1. A vehicle brake system having a spring applied fluid pressure released actuator, a source supplying pressurized fluid to said actuator for brake release, and a two position valve in the fluid circuit between said source and said actuator having a brake applied position and a brake release position, comprising a solenoid operated valve in said fluid circuit between said source and said two position valve maintaining the circuit normally closed, a momentary contact switch for closing an electrical circuit for energizing said solenoid and moving said solenoid operated valve to pressurize said brake actuator when said two position valve is in the brake release position, a pressure sensor responsive to the fluid pressure in said actuator which closes a second electric switch when a predetermined pressure is reached in said sensor and a connection from said second switch to said solenoid to maintain the solenoid energized even though said momentary contact switch is opened.

2. A vehicle brake system as in claim 1 including an indicator operated by said pressure sensor to indicate when the actuator is released.

3. A system as in claim 1 including a declutch valve for a power shift transmission, and means responsive to movement of said solenoid operated valve to the brake applied position for closing said declutch valve.

4. A vehicle brake system having a first spring applied fluid pressure released actuator for a parking brake, a second pressure applied actuator for a service brake, a pump supplying pressurized fluid to said actuators, a two position valve in a fluid circuit between said pump and said parking brake actuator having a brake applied position and a brake released position, and an electrical source, comprising a solenoid operated valve in said fluid circuit between said pump and said two position valve maintaining the fluid circuit normally closed, a momentary contact switch for closing an electrical circuit for energizing said solenoid and moving said solenoid operated valve from a brake applied position to a brake released position to pressurize said first actuator when said two position valve is in the brake released position, a pressure sensor responsive to fluid pressure in said first actuator which closes a second electric switch when a predetermined pressure is reached in said sensor, a connection from said second switch to said solenoid to maintain the solenoid energized even though said momentary contact switch is opened, a declutch valve for a power shift transmission and means responsive to the movement of said solenoid operated valve to the brake applied position for closing said declutch valve.

5. A vehicle brake system as in claim 4 including a second pressure sensor responsive to system fluid pressure and a second indicator operated by said second sensor to indicate when the fluid system is ready for operation.

6. A vehicle brake system as in claim 4 in which said means comprises a second solenoid operated valve having a declutch open position and a declutch closed position, and a switch closed by said first sensor when said parking brake actuator is applied for moving said second solenoid operated valve to the declutch closed position.

7. A vehicle brake system as in claim 6 which includes a normally closed switch in circuit with the solenoid of said second solenoid operated valve which when it is opened deenergizes said second solenoid operated valve and allows it to move to the declutch open position even though the parking brake is applied.

8. A brake system as in claim 7 in which each of the said solenoid operated valves is provided with an additional return solenoid.

9. A vehicle brake system as in claim 6 in which said second solenoid operated valve is a two position three way valve and fluid connections are provided from the service brake for directing pressurized fluid through such valve in the declutch on position for closing the declutch valve when the service brake actuator is pressurized.

10. A brake system as in claim 9 in which a switch is provided in the electrical circuit for moving said second solenoid operated valve to the declutch open position even though said parking brake actuator is applied.

* * * * *